US006623601B2

(12) United States Patent
Graf et al.

(10) Patent No.: US 6,623,601 B2
(45) Date of Patent: Sep. 23, 2003

(54) ROLL FOR PAPER-MAKING MACHINE

(75) Inventors: Edwin X. Graf, Menasha, WI (US); Daniel J. Foster, Appleton, WI (US); Douglas H. Angel, Concord, NC (US)

(73) Assignee: Voith Sulzer Paper Technology North America, Inc., Appleton, WI (US)

(*) Notice: Subject to any disclaimer, the term of this patent is extended or adjusted under 35 U.S.C. 154(b) by 0 days.

(21) Appl. No.: 10/054,040

(22) Filed: Jan. 22, 2002

(65) Prior Publication Data

US 2002/0059727 A1 May 23, 2002

Related U.S. Application Data

(62) Division of application No. 09/512,940, filed on Feb. 25, 2000, now Pat. No. 6,339,883.

(51) Int. Cl.$^7$ ................................. D21F 3/08
(52) U.S. Cl. ........................ 162/272; 492/20; 492/53
(58) Field of Search ........................ 162/357, 358.1, 162/272, 368, 372, 202, 203, 205, 206, 199, 305, 306, 358.5, 360.2, 360.3, 361, 373, 381; 492/53, 56, 49, 3, 7, 20, 28, 30, 33, 34, 37; 29/892.32; 100/155 R

(56) References Cited

U.S. PATENT DOCUMENTS

| 4,704,776 | A | * | 11/1987 | Watanabe et al. | ............. 492/54 |
|---|---|---|---|---|---|
| 4,951,392 | A | * | 8/1990 | Miihkinen | ............. 29/895.211 |
| 5,111,567 | A | * | 5/1992 | Leino et al. | ............. 492/58 |
| 5,334,288 | A | * | 8/1994 | Nasu et al. | ............. 162/358.1 |
| 5,406,705 | A | | 4/1995 | Kildune | ............. 29/895.32 |
| 5,564,196 | A | * | 10/1996 | Nomura et al. | ............. 34/110 |
| 5,569,142 | A | * | 10/1996 | Snellman | ............. 492/56 |
| 5,632,861 | A | * | 5/1997 | Crouse | ............. 162/358.1 |
| 5,753,165 | A | | 5/1998 | Watanabe et al. | ............. 492/56 |
| 5,976,064 | A | | 11/1999 | Telama | ............. 492/53 |
| 6,167,623 | B1 | | 1/2001 | Niemi et al. | ............. 29/895.32 |
| 6,471,626 | B1 | * | 10/2002 | Karger et al. | ............. 492/50 |
| 6,520,897 | B1 | * | 2/2003 | Karger et al. | ............. 492/54 |

FOREIGN PATENT DOCUMENTS

| GB | 2169381 | * | 7/1986 | ............. 162/358.1 |
|---|---|---|---|---|
| JP | 2001-329481 | * | 11/2001 | ............. D21F/3/02 |

* cited by examiner

Primary Examiner—Steven P. Griffin
Assistant Examiner—Eric Hug
(74) Attorney, Agent, or Firm—Taylor & Aust, P.C.

(57) ABSTRACT

A paper-making machine includes a traveling substrate and a roll carrying the substrate. The roll includes a carbon fiber shell, a ceramic layer over the shell, and a polytetrafluoroethylene layer over the ceramic layer. The polytetrafluoroethylene layer defines an outer surface of the roll. The ceramic layer intermittently extends through the polytetrafluoroethylene layer to the outer surface of the roll.

19 Claims, 2 Drawing Sheets

ROLL FOR PAPER-MAKING MACHINE

This is a divisional application of application Ser. No. 09/512,940 filed Feb. 25, 2000 now U.S. Pat. No. 6,339,883.

BACKGROUND OF THE INVENTION

1. Field of the Invention

The present invention relates to paper-making machines, and, more particularly, to a roll within a paper-making machine and method of manufacturing the same.

2. Description of the Related Art

A paper-making machine receives a prepared fiber suspension and produces a fiber web, such as a paper web. The paper-making machine typically includes a plurality of rolls along the length thereof which respectively carry a plurality of traveling substrates through the paper-making machine. For example, each respective roll may carry a forming fabric, belt, felt and/or fiber web (such as a paper web). Depending upon the intended use of the roll, the roll configuration varies from one roll to another within a paper-making machine. For example, a roll may be constructed from granite which is very heavy and has good release properties. Such a roll may weigh 20 tons or more, and may rotate with a tangential speed of about 3500 feet per minute. With such a heavy mass and high rotational speed, the inertia of this type of roll is very high.

For other applications, it is desirable to maintain the inertia of the rotating roll relatively low. For example, a roll within a paper-making machine may be used to measure tension on a traveling substrate carried thereby. Typically, load cells are associated with the bearing journal at each end of the rotating roll which provide output signals indicative of the tension within the traveling substrate. It is desirable to maintain the inertia of such a roll as low as possible to avoid affecting the loads sensed by the load cells.

What is needed in the art is a roll for use in a paper-making machine which has a low inertia, as well as good wear and release properties.

SUMMARY OF THE INVENTION

The present invention provides a roll for use in a paper-making machine having an outer surface with different exposed materials to provide optimal wear and release properties.

The invention comprises, in one form thereof, a paper-making machine including a traveling substrate and a roll carrying the substrate. The roll includes a carbon fiber shell, a ceramic layer over the shell, and a polytetrafluoroethylene (PTFE) layer over the ceramic layer. The PTFE layer defines an outer surface of the roll. The ceramic layer intermittently extends through the PTFE layer to the outer surface of the roll.

An advantage of the present invention is that a roll has good wear as well as release properties.

Another advantage is that the wear and release properties may be varied.

Yet another advantage is that the roll may be manufactured using conventional processing techniques, combined together in a novel manner including operating parameters.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
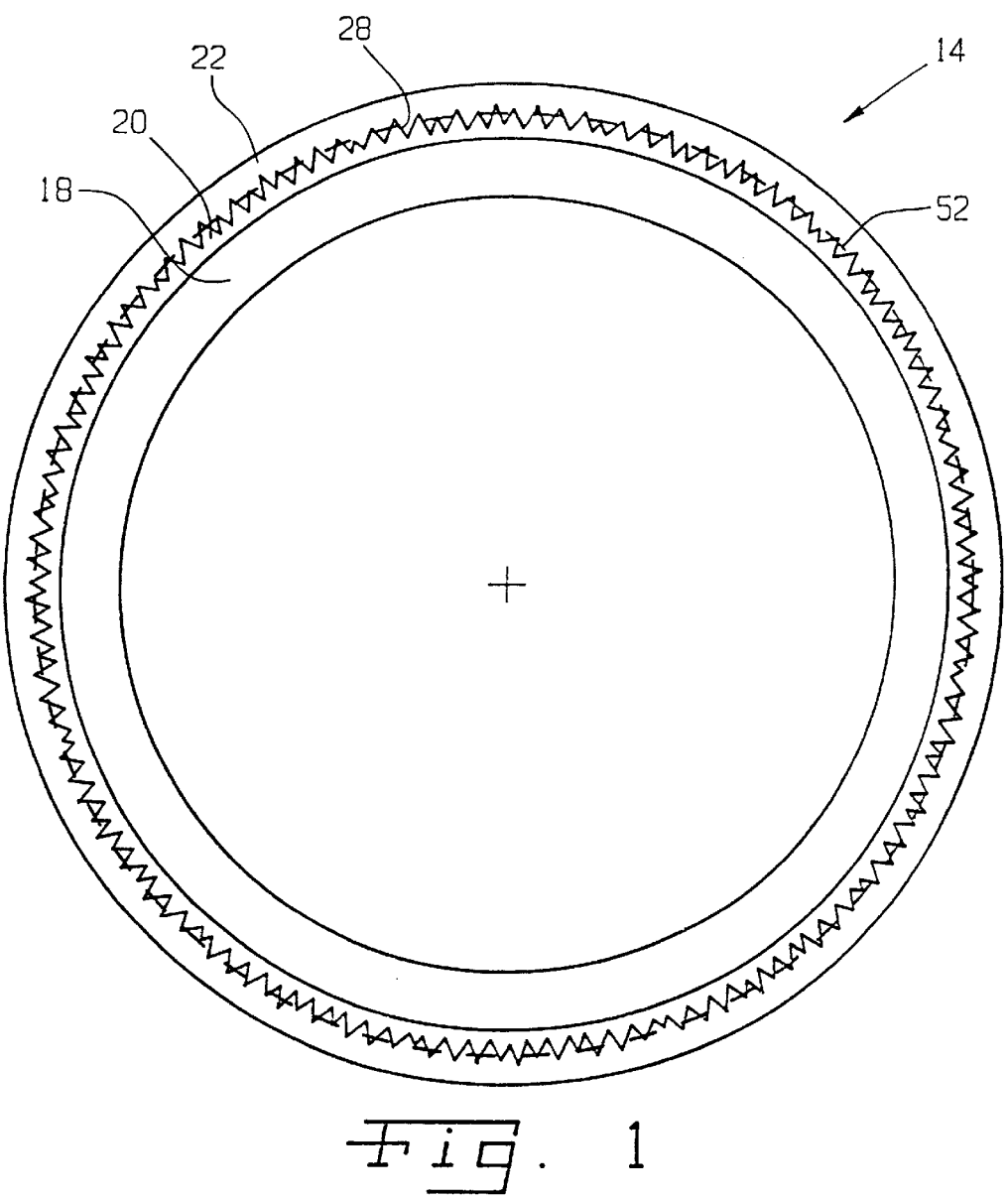
FIG. 1 is an end view of an embodiment of a roll of the present invention for use in a paper-making machine, as viewed after application of the PTFE layer during manufacture.
Figure 2:
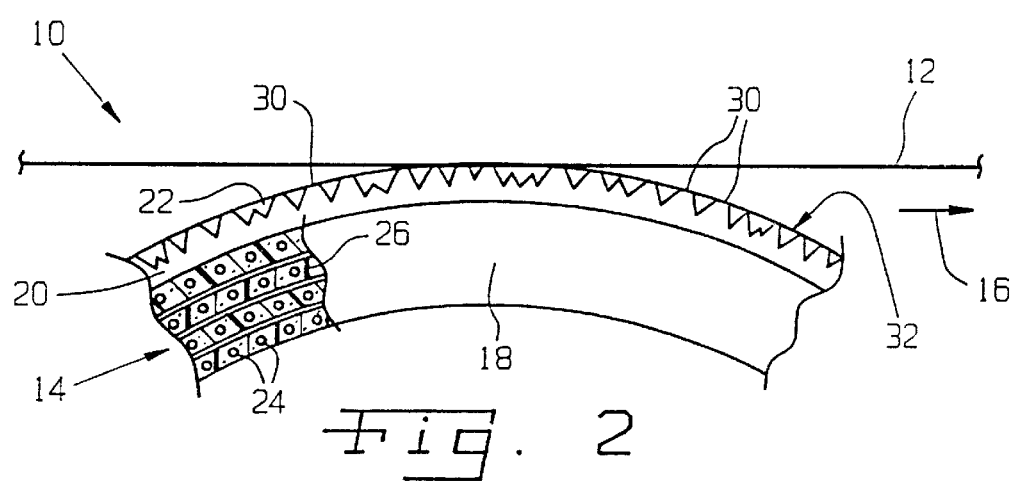
FIG. 2 is an enlarged, fragmentary view of a portion of the roll shown in FIG. 1, carrying a substrate in the form of a traveling fiber web.

Referring now to the drawings, and more particularly to FIGS. 1 and 2, there is shown a portion of a paper-making machine 10, including a traveling substrate 12 and roll 14.

Substrate 12 is carried by roll 14, and moves in a travel direction 16 through paper-making machine 10. Substrate 12 may be used to carry a fiber web or is itself a fiber web. For example, substrate 12 may be in the form of a forming fabric, felt, belt or fiber web (such as a paper web).

Roll 14 includes a composite fiber shell 18, wear resistant layer 20 and release layer 22. Wear resistant layer 20 and release layer 22, as the respective names imply, are so termed with respect to the physical properties to which they impart to roll 14, and co-act with each other in a manner as will be described hereinafter to provide roll 14 with desirable wear and release properties.

Composite fiber shell 18, in the embodiment shown, is in the form of a carbon fiber shell including a plurality of carbon fibers 24 and a binder 26, shown in a simplified, fragmentary manner in FIG. 2 for purposes of illustration. Shell 18 may be formed in a suitable manner, such as by helically, circumferentially and/or tangentially orienting carbon fibers 24 about a mandrel (not shown) while concurrently applying binder 26. Carbon fiber shell 18 may also include chopped carbon fibers.

Although composite fiber shell 18 is shown in the form of a carbon fiber shell in FIGS. 1 and 2, is also possible to form composite fiber shell 18 from other suitable composite materials, such as fiberglass fibers, etc. Moreover, the particular type of binder 26 which is utilized may vary from one application to another, depending upon, e.g., desired strength and sublimation properties.

Wear resistant layer 20 is applied over carbon fiber shell 18 so as to define a surface with a desired unevenness or porosity. More particularly, wear resistant layer 20 includes a plurality of raised portions 28 which define peaks and valleys (not numbered) at the periphery of wear resistant layer 20 (FIG. 1) which are ultimately formed into a plurality of lands 30 at an outer surface 32 of roll 14 (FIG. 2). Lands 30 stand proud at outer surface 32, and thus carry substrate 12 and add to the wear resistant properties of roll 14.

In the embodiment shown, wear resistant layer 20 is in the form of a ceramic layer which is sprayed onto shell 18. More particularly, wear resistant layer 20 is in the form of a ceramic consisting essentially of about 60% aluminum oxide ($Al_2O_3$) and 40% titanium dioxide ($TiO_2$). Wear resistant layer 20 may be formed from other suitable types of wear resistant materials, such as a sputtered metal, etc.

Ceramic layer 20, in the embodiment shown, has a thickness of between about 0.002 and 0.05 inch; preferably a thickness of between 0.005 and 0.010 inch; and more preferably a thickness of about 0.008 inch.

Release layer 22 functions to improve the release of substrate 12 from outer surface 32 of roll 14 during operation. Release layer 22 has better release properties than wear resistant layer 20, and defines outer surface 32. In the embodiment shown, release layer 22 is in the form of polytetrafluoroethylene (PTFE) which is substantially chemically inert, has low friction properties, and good release properties. PTFE layer 22 is applied over ceramic layer 20 in a suitable manner such that raised portions 28 of ceramic layer 20 are substantially entirely covered. A portion of PTFE layer 22 is then removed from the radial periphery of roll 14, such that a radially outer part of raised portions 28 are removed to thereby define lands 30. Thus, both ceramic layer 20 and PTFE layer 22 are exposed at outer surface 32 and thereby carry substrate 12. The combination of exposed PTFE layer 22 and ceramic layer 20 provides desired wear and release properties of roll 14 with respect to traveling substrate 12 carried thereby. The release properties may be enhanced by increasing the percentage of PTFE exposed at outer surface 32, while the wear properties of roll 14 may be enhanced by increasing the proportion of lands 30 exposed at outer surface 32. That is, the porosity of ceramic layer 20 and/or the amount of PTFE layer 22 which is removed may be varied to alter the wear and release properties of roll 14.

Figure 3:
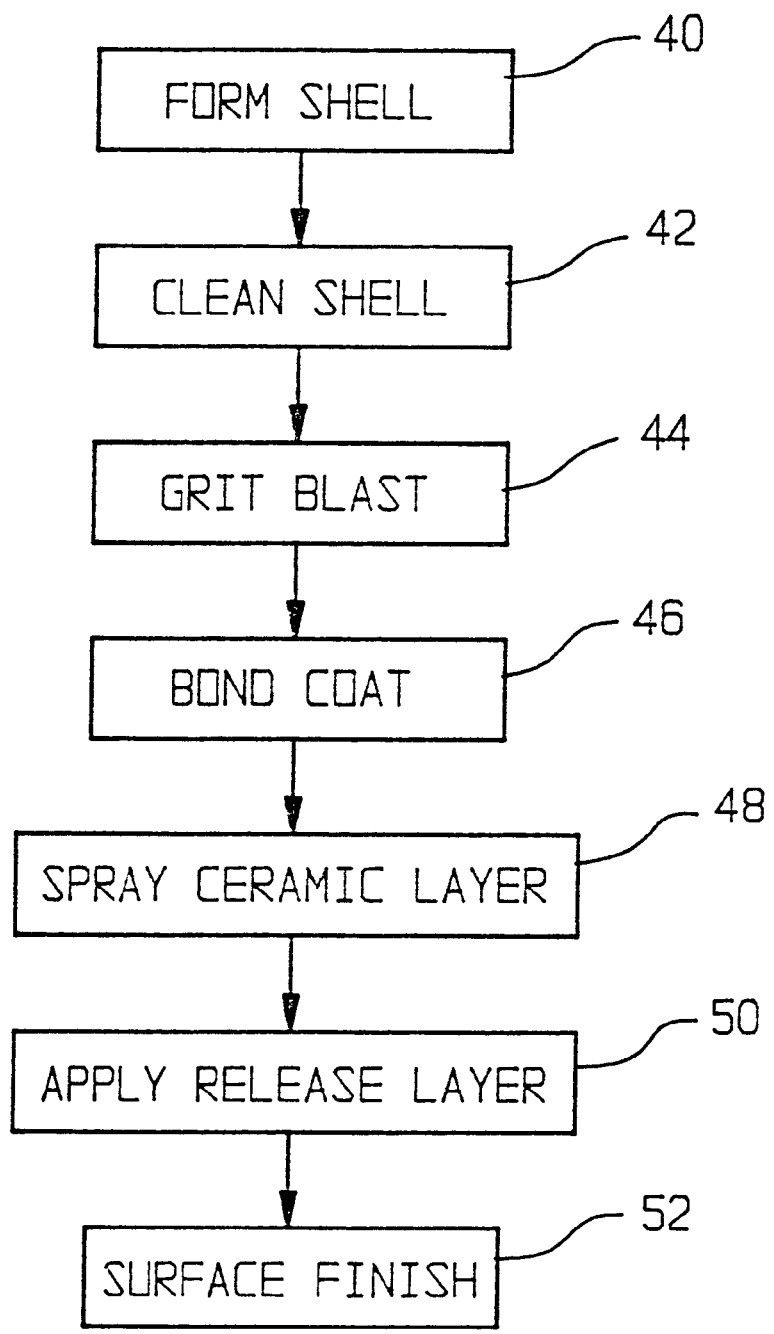
FIG. 3 is a flow chart illustrating a method of the present invention for forming the roll shown in FIGS. 1 and 2.

Referring now to FIG. 3, an embodiment of a method of the present invention for forming roll 14 for use in papermaking machine 10 will be described. First, carbon fiber shell 18 is formed in a manner as described above, such as by helical, circumferential and/or tangential placement of carbon fibers 24 on a mandrel (block 40). Carbon fiber shell 18 is then chemically cleaned, such as by wiping with the denatured alcohol (block 42). Carbon fiber shell 18 is then grit blasted with #60 grit aluminum oxide at an operating blasting pressure of between approximately 40 and 60 pounds per square inch (psi) (block 44). Carbon fiber shell 18 may again be cleaned to remove the aluminum oxide residue, such as by wiping with the denatured alcohol.

After carbon fiber shell 18 is formed and prepared (blocks 40–44), an optional bond coat (not shown in FIGS. 1 and 2) may be applied to carbon fiber shell 18 (block 46). More particularly, carbon fiber shell 18 is secured within a lathe and rotated to a surface speed of about 3000 inches per minute. Using a twin wire arc plasma spray device, a 14 gauge diameter wire feed material consisting of about 80% nickel and 20% chrome by weight is applied to carbon fiber shell 18. A bond coat from another suitable material such as zinc, aluminum, tin and/or electroless nickel may be applied. The spray gun of the twin wire arc plasma spray device traverses carbon fiber shell 18 in a longitudinal direction at a speed of about 0.250 inch per roll revolution. The twin wire arc plasma spray device operates at an atomizing air pressure of about 80 psi (clean, dry compressed air); a stand off distance of about 8 inches; an amperage of about 50 amps (adjusted so that the total deposit layer of thickness per pass does not exceed 0.0005 inch); and a voltage adjusted to a minimum value while still maintaining a stable arc. The bond coat is applied in multiple passes, with the spray gun traversing back and forth in a longitudinal direction along carbon fiber shell 18, until a total bond coat thickness of about 0.003 inch is achieved.

A top coat consisting of wear resistant layer 20 is then applied over the bond coat, or directly to carbon fiber shell 18 (block 48). More particularly, ceramic layer 20 is sprayed over the bond coat as soon as possible after application of the bond coat. Ceramic layer 20 is sprayed over the bond coat at a temperature which is less then a sublimation temperature of carbon fiber shell 18. In the embodiment shown, ceramic layer 20 is sprayed onto carbon fiber shell 18 at a temperature of less then about 200° F., and preferably at a temperature of about 175° F. Ceramic layer 20 is formed using a plasma spray device which applies a ceramic powder with a normal size distribution of between 10 and 53 microns, with a composition of about 60% aluminum oxide ($Al_2O_3$) and 40% titanium dioxide ($TiO_2$) by weight. Ceramic layer 20 is sprayed onto carbon fiber shell 18 with an average of less then 100 amps between the electrodes within the plasma spray gun, and preferably with an amperage of between 20 and 80 amps between the electrodes. The spray gun of the plasma spray device travels along the longitudinal length of carbon fiber shell 18 at a travel speed of about 0.125 inch per roll revolution; and is adjusted so that no more then 0.001 inch and preferably about 0.0005 inch of ceramic material is sprayed onto carbon fiber shell 18 during each pass along, the length of carbon fiber shell 18 (approximately 6 lbs. per hour at 80% deposit efficiency). The ceramic powder is applied in successive multiple passes until ceramic layer 20 has a total thickness of between 0.002 and 0.05 inch, preferably between about 0.005 and 0.010 inch; and more preferably about 0.008 inch. The spray gun of the plasma spray device is adjusted such at a homogenous ceramic coating structure is applied with minimal (less then 1%) or no visible unmelted particles present, and a porosity of between 4 and 6% when viewed in cross section at 325× magnification.

PTFE layer 22 is then sprayed over ceramic layer 20 using a plasma spray device with a spray gun (block 50). PTFE layer 22 is sprayed over ceramic layer 20 while ceramic layer 20 is still warm (between 100° and 150° F.) using a PTFE solution with oven curable PTFE. The PTFE solution is preferably selected with a relatively low viscosity for easier spraying. Moreover, the PTFE solution is selected with a cure temperature that is low enough that oven curing does not cause sublimation of carbon fiber shell 18. The PTFE solution is sprayed over ceramic layer 20 in multiple passes during rotation of roll 14 until PTFE layer 22 has a desired thickness and substantially covers raised portions 28. An example of a commercially available plasma spray device which is suitable for applying the bond coat, ceramic layer 20 and/or PTFE layer 22 is sold by Sulzer Metco, Inc., having an address at 1972 Meijer Drive, Troy, Mich. 48084, USA.

Roll 14 is then surface finished to remove a portion of PTFE layer 22 (radially outward from phantom line 54), and thereby form lands 30 (block 52). More particularly, roll 14 is surface finished using a vibratory hone such as a silicon carbide or diamond hone. The amount of PTFE layer 22 which is removed, as well as the surface finish of outer surface 32, provides optimum wear and release properties with respect to traveling substrate 12. In the embodiment shown, approximately 0.003 inch of PTFE layer 22 is removed from roll 14 to define outer surface 32. Outer surface 32 has a final as ground surface roughness which is between approximately 30 and 60 RA.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A paper-making machine, comprising:

a traveling substrate; and a roll carrying said substrate, said roll including a carbon fiber shell, a ceramic layer substantially covering said shell, and a polytetrafluoroethylene layer over said ceramic layer, said polytetrafluoroethylene layer defining an outer surface of said roll, said ceramic layer intermittently extending through said polytetrafluoroethylene layer to said outer surface said outer surface having a first percentage of ceramic area exposed on said outer surface, said ceramic layer and said polytetrafluoroethylene layer coacting such that as said outer surface is removed that a second percentage of said ceramic area is exposed, said second percentage being larger than said first percentage.

2. The paper-making machine of claim 1, wherein said ceramic layer includes a plurality of raised portions which extend through said polytetrafluoroethylene layer to said outer surface, at least some of said plurality of raised portions including respective lands which are generally coterminous with said outer surface.

3. The paper-making machine of claim 1, wherein said ceramic layer is comprised of Al2O3 and TiO2.

4. The paper-making machine of claim 3, wherein said ceramic layer is comprised of about 60% Al2O3 and 40% TiO2.

5. The paper-making machine of claim 1, wherein said ceramic layer has a thickness of between about 0.002 and 0.05 inch.

6. The paper-making machine of claim 5, wherein said ceramic layer has a thickness of between about 0.005 and 0.010 inch.

7. The paper-making machine of claim 6, wherein said ceramic layer has a thickness of about 0.008 inch.

8. The paper-making machine of claim 1, wherein said carbon fiber shell includes a plurality of carbon fibers and a binder.

9. The paper-making machine of claim 1, wherein said substrate comprises one of a forming fabric, felt, belt and fiber web.

10. A paper-making machine, comprising:

a traveling substrate; and a roll including a composite fiber shell, a wear resistant layer over said shell, and a release layer over said wear resistant layer, said release layer defining an outer surface of said roll which carries said substrate, said wear resistant layer having better wear properties than said release layer, said release layer having better release properties than said wear resistant layer with respect to said traveling substrate, said wear resistant layer intermittently extending through said release layer to said outer surface, said outer surface having a first percentage of said wear resistant layer exposed on said outer surface, said wear resistant layer and said release layer coacting such that as said outer surface is removed that a second percentage of said wear resistant layer is exposed, said second percentage being larger than said first percentage.

11. The paper-making machine of claim 10, wherein said wear resistant layer includes a plurality of raised portions which extend through said release layer to said outer surface, at least some of said plurality of raised portions including respective lands which are generally coterminous with said outer surface.

12. The paper-making machine of claim 11, wherein said wear resistant layer is a ceramic layer and said release layer is a polytetrafluoroethylene layer.

13. The paper-making machine of claim 12, wherein said ceramic layer is comprised of Al2O3 and TiO2.

14. The paper-making machine of claim 11, wherein said ceramic layer is comprised of about 60% Al2O3 and 40% TiO2.

15. The paper-making machine of claim 11, wherein said ceramic layer has a thickness of between about 0.002 and 0.05 inch.

16. The paper-making machine of claim 15, wherein said ceramic layer has a thickness of between about 0.005 and 0.010 inch.

17. The paper-making machine of claim 16, wherein said ceramic layer has a thickness of about 0.008 inch.

18. The paper-making machine of claim 10, wherein said composite fiber shell includes a plurality of carbon fibers and a binder.

19. The paper-making machine of claim 10, wherein said substrate comprises one of a forming fabric, felt, belt and paper web.

* * * * *